US010489949B2

(12) United States Patent
Yamasaki et al.

(10) Patent No.: US 10,489,949 B2
(45) Date of Patent: Nov. 26, 2019

(54) EFFECT GENERATION DEVICE AND EFFECT GENERATION METHOD

(71) Applicant: SONY CORPORATION, Tokyo (JP)

(72) Inventors: Rio Yamasaki, Tokyo (JP); Takaaki Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/528,841

(22) PCT Filed: Dec. 24, 2015

(86) PCT No.: PCT/JP2015/085941
§ 371 (c)(1),
(2) Date: May 23, 2017

(87) PCT Pub. No.: WO2016/111174
PCT Pub. Date: Jul. 14, 2016

(65) Prior Publication Data
US 2017/0309051 A1    Oct. 26, 2017

(30) Foreign Application Priority Data
Jan. 6, 2015    (JP) .................................. 2015-001148

(51) Int. Cl.
*G06T 11/60*    (2006.01)
*G06T 13/80*    (2011.01)
(Continued)

(52) U.S. Cl.
CPC .......... *G06T 11/60* (2013.01); *G06K 9/00228* (2013.01); *G06K 9/00281* (2013.01);
(Continued)

(58) Field of Classification Search
CPC ......... G06T 11/60; G06T 11/00; G06T 13/80; G06T 19/00; G06T 19/006;
(Continued)

(56) References Cited

U.S. PATENT DOCUMENTS

2011/0181774 A1\* 7/2011 Masuda .................. G06T 11/60
348/473
2013/0088422 A1\* 4/2013 Niikura .................... G06F 3/017
345/156

FOREIGN PATENT DOCUMENTS

JP    2009-059014 A    3/2009
JP    2012-521039 A    9/2012
(Continued)

*Primary Examiner* — Chong Wu
(74) *Attorney, Agent, or Firm* — Chip Law Group

(57) ABSTRACT

The present disclosure relates to an effect generation device, an effect generation method, and a program that enable the generation of a new effect in accordance with an interaction between physical objects. An image processing device includes a detector that detects a face and an object from an input image, a face feature point analyzer that extracts a plurality of feature points locating a part constituting the face, an object feature point analyzer that extracts a plurality of feature points locating a part constituting the object, a determination unit that determines a relationship between target objects including positions of the plurality of target objects and at least an expression on the face, and an effect generator that generates a predetermined corresponding effect on the basis of the determined relationship. The present technology can be applied to, for example, an imaging device.

15 Claims, 14 Drawing Sheets

(51) Int. Cl.
*G06T 19/00* (2011.01)
*G06K 9/00* (2006.01)

(52) U.S. Cl.
CPC .......... *G06K 9/00671* (2013.01); *G06T 13/80* (2013.01); *G06T 19/00* (2013.01); *G06T 19/006* (2013.01); *G06K 2209/25* (2013.01)

(58) Field of Classification Search
CPC .......... G06K 9/00228; G06K 9/00281; G06K 9/00671; G06K 2209/25
See application file for complete search history.

(56) References Cited

FOREIGN PATENT DOCUMENTS

| | | |
|---|---|---|
| JP | 2014-006912 A | 1/2014 |
| WO | 2010/116820 A1 | 10/2010 |

* cited by examiner

[FLAG NAME: OPEN MOUTH]
FEATURE POINT 1 COORDINATES: X1, Y1
FEATURE POINT 2 COORDINATES: X2, Y2
⋮
FEATURE POINT n COORDINATES: Xn, Yn

[FLAG NAME: LAUGHING]
FEATURE POINT 1 COORDINATES: X1, Y1
FEATURE POINT 2 COORDINATES: X2, Y2
⋮
FEATURE POINT n COORDINATES: Xn, Yn

[FLAG NAME: SULKY]
FEATURE POINT 1 COORDINATES: X1, Y1
FEATURE POINT 2 COORDINATES: X2, Y2
⋮
FEATURE POINT n COORDINATES: Xn, Yn

FIG. 6

| MEANING FLAG FOR FACE | MEANING FLAG FOR OBJECT | POSITIONAL RELATION BETWEEN FACE AND OBJECT (X, Y) | DEPTH RELATION BETWEEN FACE AND OBJECT (Z) | FLAG NAME FOR INTERACTION | DISPLAY EFFECT NAME |
|---|---|---|---|---|---|
| OPEN MOUTH | SPILLING OUT | FACE AND OBJECT IN CONTACT | OBJECT LOCATED IN FRONT OF FACE | PERSON DRINKING OBJECT | "CHUG CHUG" |
| LAUGHING | SPILLING OUT | FACE AND OBJECT IN CONTACT | OBJECT LOCATED IN FRONT OF FACE | PERSON DRINKING OBJECT HAPPILY | "IT'S GOOD!" |
| SULKY | ALMOST FINISHING | — | — | PERSON WISHING TO DRINK ONE MORE OBJECT | "NEED ONE MORE DRINK" |
| — | BEING SHAKEN | FACE AND OBJECT IN CLOSER DISTANCE THAN CERTAIN DISTANCE | OBJECT LOCATED IN FRONT OF FACE | OBJECT SPLASHING ON PERSON | "FIZZING" "WOW!" |

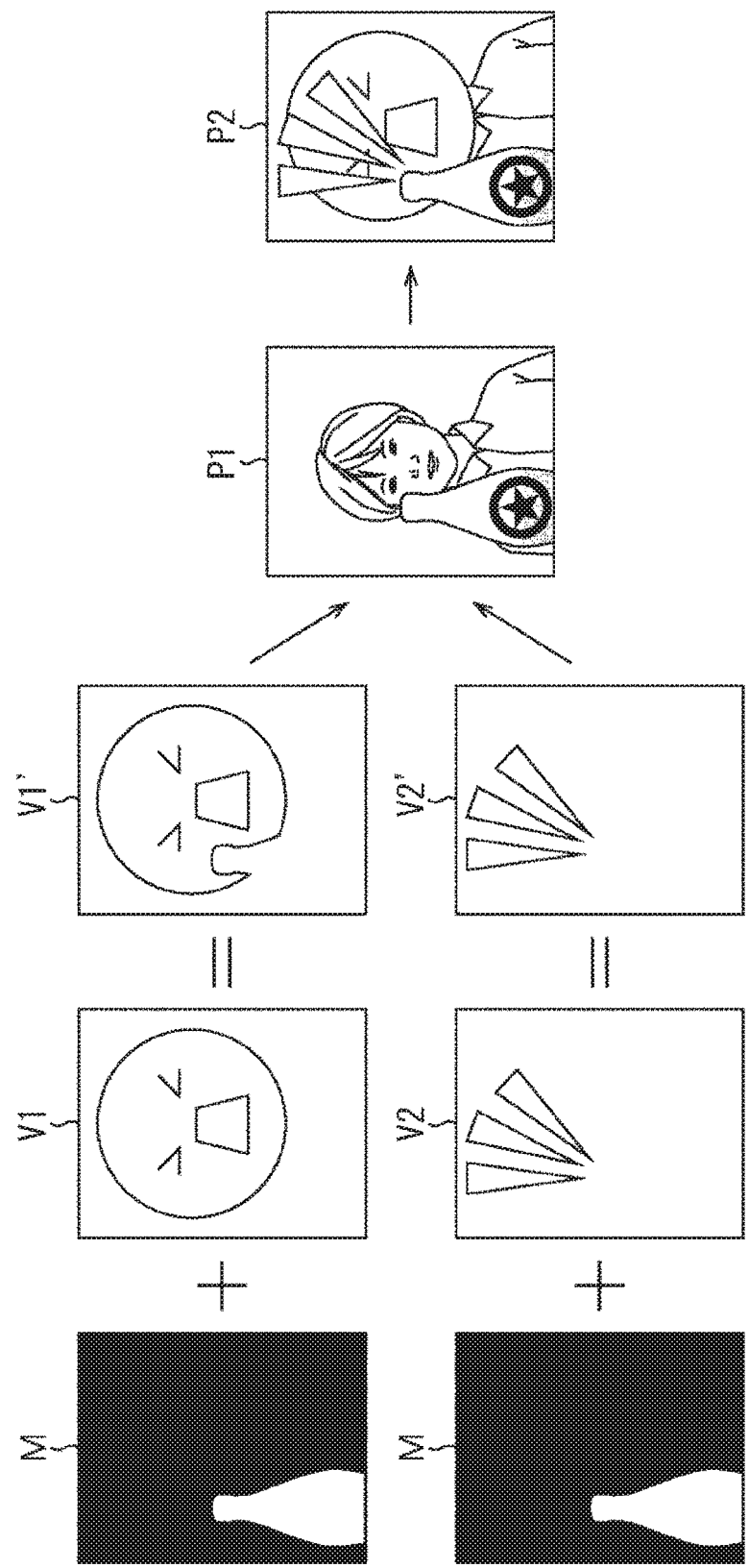

FIG. 11
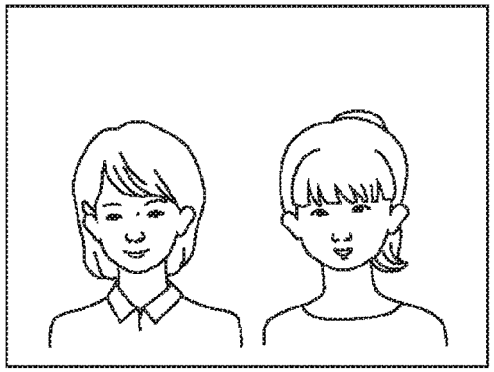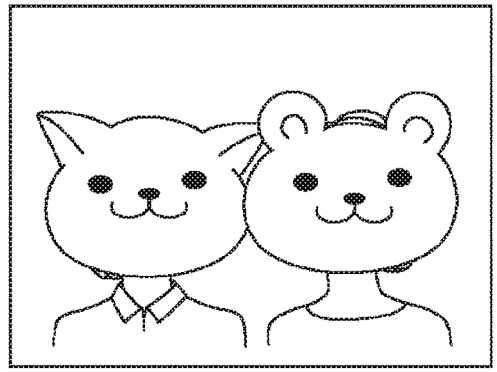
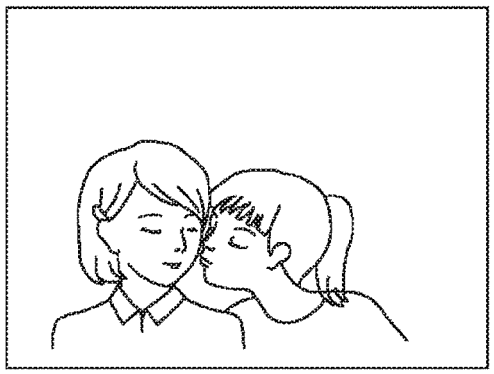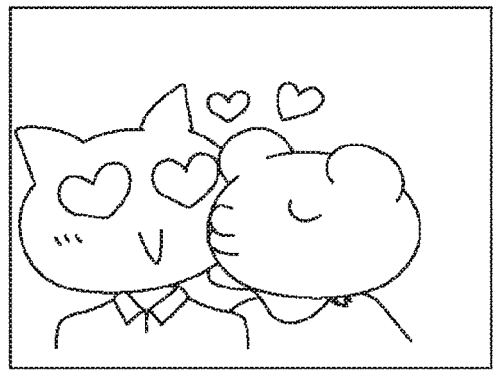

FIG. 12
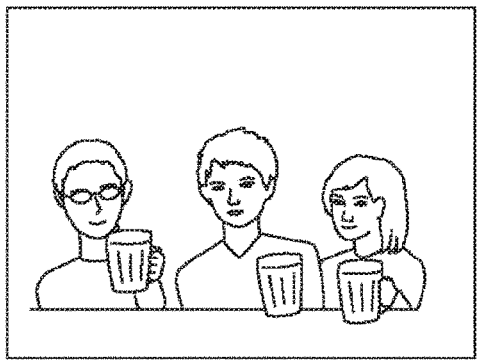 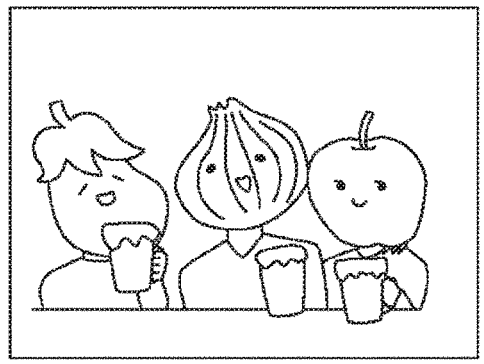
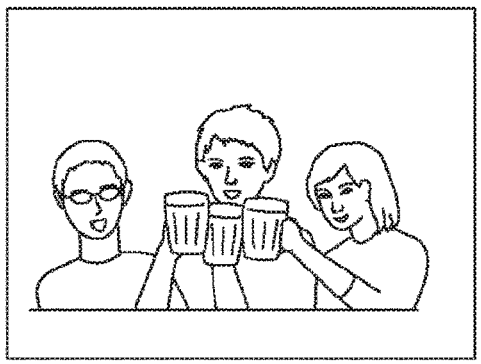 

FIG. 13
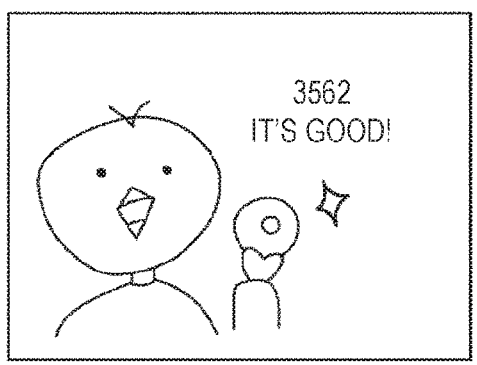

EFFECT GENERATION DEVICE AND EFFECT GENERATION METHOD

CROSS REFERENCE TO RELATED APPLICATIONS

This application is a U.S. National Phase of International Patent Application No. PCT/JP2015/085941 filed on Dec. 24, 2015, which claims priority benefit of Japanese Patent Application No. JP 2015-001148 filed in the Japan Patent Office on Jan. 6, 2015. Each of the above-referenced applications is hereby incorporated herein by reference in its entirety.

TECHNICAL FIELD

The present disclosure relates to an effect generation device, an effect generation method, and a program. In particular, the present disclosure relates to an effect generation device, an effect generation method, and a program that have been enabled to generate a new effect in accordance with an interaction between physical objects.

BACKGROUND ART

A product or a service to which an augmented reality (AR) technology is applied has been spread in the past. The augmented reality (AR) technology realizes the interaction between an object in a real world and an object in a virtual world within a screen of a smartphone or a game console. Among such technology is a one that uses multiple cards (physical objects) to realize the interaction with characters (virtual objects) associated with the respective cards within a screen (virtual world), examples of which include a card game.

According to this technology, interaction content is specified on the basis solely of a positional relation between the physical objects in most cases and accordingly, not only operation content implemented in a physical world but also the interaction content by the virtual object corresponding to such operation content has been consequently limited.

Compared to this, for example, Patent Document 1 has suggested a method for analyzing respective feature points of a face, a thing and so on and then using results of the feature point analysis to vary a type of a virtual effect or a way of rendering a virtual effect to be accompanied with the respective feature points.

Meanwhile, Patent Document 2 has suggested a method for analyzing respective feature points of a face, a thing and so on and even giving meanings thereto (for example, "gripping" is given when movements of fingers of a hand curling up is observed) to utilize results obtained by giving meanings in this manner. This achieves, for example, the transformation of the associated virtual object (e.g., the hand within the screen) or the virtual object affected by this associated virtual object (e.g., a ball within the screen), or alternatively, the interaction therebetween (e.g., the hand gripping the ball within the screen).

CITATION LIST

Patent Document

Patent Document 1: Japanese Patent Application Laid-Open No. 2014-006912

Patent Document 2: Japanese National Publication of International Patent Application No. 2012-521039

SUMMARY OF THE INVENTION

Problems to be Solved by the Invention

Incidentally, both of Patent Documents 1 and 2 have only realized the interaction between the virtual objects individually associated with multiple physical objects while these physical objects interact in the real world but have not achieved the presentation of a new virtual effect in such a scene. For example, in a case where an action of tilting a cup in a hand is carried out in the real world, a similar interaction is simply realized in the virtual world as well by the virtual objects associated with the hand and the cup but the virtual effect of drinking water in the cup has never been presented.

The present disclosure has been made by taking such a situation into account and an object thereof is to enable the generation of a new effect in accordance with an interaction between physical objects.

Solutions to Problems

An effect generation device according to an aspect of the present disclosure includes a detector that detects two or more target objects at least including a face from an input image, and an effect generator that generates a predetermined corresponding effect depending on a relation between the target objects detected by the detector.

An effect generation method or a program according to an aspect of the present disclosure includes a step of detecting two or more target objects at least including a face from an input image, and a step of generating a predetermined corresponding effect depending on a relation between the detected target objects.

According to an aspect of the present disclosure, two or more target objects at least including a face are detected from an input image and then, the predetermined corresponding effect is generated depending on the relation between these detected target objects.

Effects of the Invention

An aspect of the present disclosure enables the generation of a new effect in accordance with an interaction between physical objects.

BRIEF DESCRIPTION OF DRAWINGS

FIG. 6 is a diagram illustrating exemplary interaction model data referenced during interaction interpretation processing.

FIG. 7 is a diagram for explaining map creation processing.

FIG. 11 is a diagram for explaining a virtual effect corresponding to an interaction between faces of two subject persons.

FIG. 12 is a diagram for explaining a virtual effect corresponding to an interaction between a large number of subject persons.

FIG. 13 is a diagram for explaining an example of varying the virtual effect.

MODE FOR CARRYING OUT THE INVENTION

Hereinafter, specific embodiments to which the present technology is applied will be described in detail with reference to the drawings.

Figure 1:
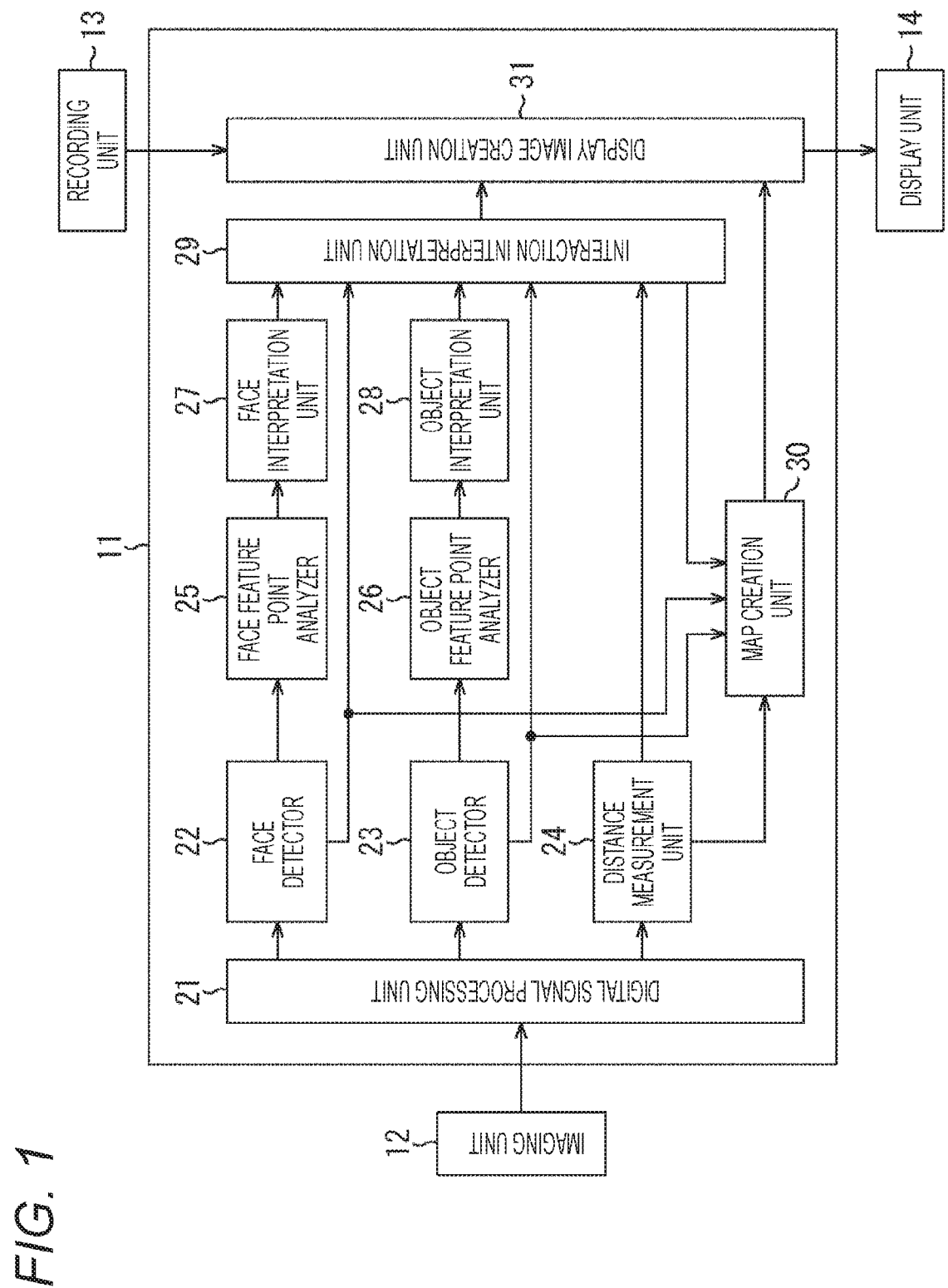
FIG. 1 is a block diagram illustrating an exemplary configuration of an image processing device according to an embodiment to which the present technology is applied.

FIG. 1 is a block diagram illustrating an exemplary configuration of an image processing device serving as an effect generation device according to an embodiment to which the present technology is applied.

The image processing device 11 illustrated in FIG. 1 is capable of applying image processing to an input image using various pieces of data recorded in an recording unit 13 by regarding an image captured by an imaging unit 12 as the input image and then outputting this image to which the image processing has been applied as an output image to display on a display unit 14. For example, the image processing device 11 can be built into an imaging device such as a digital camera as one function provided by the imaging device.

The configuration of the image processing device 11 includes a digital signal processing unit 21, a face detector 22, an object detector 23, a distance measurement unit 24, a face feature point analyzer 25, an object feature point analyzer 26, a face interpretation unit 27, an object interpretation unit 28, an interaction interpretation unit 29, a map creation unit 30, and a display image creation unit 31.

A moving image captured by the imaging unit 12 is supplied to the digital signal processing unit 21 frame by frame. Subsequently, the digital signal processing unit 21 sequentially applies, to an image of each of the frames, various types of digital signal processing required by the image processing device 11 to carry out the image processing and then supplies the resultant image to the face detector 22, the object detector 23, and the distance measurement unit 24.

The face detector 22 carries out face detection processing to detect a face of a subject person from the image supplied from the digital signal processing unit 21 as a target object to be detected and, when the detection of the face is successful, supplies a face area to the face feature point analyzer 25, which face area is obtained by cutting out an area where the face appears from the image. The face detector 22 also finds out face position information indicating the position of the face in the image (for example, an X coordinate and a Y coordinate on the image) to supply to the interaction interpretation unit 29 and the map creation unit 30.

The object detector 23 carries out object detection processing to detect a particular object from the image supplied from the digital signal processing unit 21 as a target object to be detected and, when the detection of the object is successful, supplies an object area to the object feature point analyzer 26, which object area is obtained by cutting out an area where the object appears from the image. The object detector 23 also finds out object position information indicating the position of the object in the image (e.g., an X coordinate and a Y coordinate on the image) to supply to the interaction interpretation unit 29 and the map creation unit 30.

The distance measurement unit 24 measures distances from an imaging device 12 to all things appearing in the image throughout the entire image supplied from the digital signal processing unit 21 and then finds out, for example, depth information on each of pixels constituting the image (e.g., a distance in a Z direction perpendicularly intersecting an image surface). Subsequently, the distance measurement unit 24 supplies the depth information on each of the pixels to the interaction interpretation unit 29 and the map creation unit 30 along with the image supplied from the digital signal processing unit 21. Note that the distance measurement unit 24 may be configured in such a manner that, for example, at least distances to the face detected by the face detector 22 and the object detected by the object detector 23 can be measured.

Once the face area is supplied from the face detector 22, the face feature point analyzer 25 carries out analysis processing to extract a plurality of feature points included in this face area (for example, points locating respective parts constituting the face, such as an eye, a nose, and a mouth). Subsequently, the face feature point analyzer 25 acquires the positions of these feature points as results of the analysis to supply to the face interpretation unit 27.

Once the object area is supplied from the object detector 23, the object feature point analyzer 26 carries out analysis processing to extract a plurality of feature points included in this object area (for example, points locating respective parts constituting the object, such as an external form and a logo). Subsequently, the object feature point analyzer 26 acquires the positions of these feature points as results of the analysis to supply to the object interpretation unit 28.

Figures 3, 4:
FIG. 3 is a diagram illustrating exemplary model data referenced during face interpretation processing.
FIG. 4 is a diagram illustrating an exemplary detected object.

The face interpretation unit 27 carries out face interpretation processing to interpret a state of the face appearing in the image and then give a meaning to this state of the face by referencing model data as illustrated in FIG. 3 (described later) on the basis of the analysis results supplied from the face feature point analyzer 25. Subsequently, the face interpretation unit 27 supplies a flag name indicating the state of the face determined through the face interpretation processing to the interaction interpretation unit 29. Note that the face interpretation processing by the face interpretation unit 27 will be described later with reference to the model data illustrated in FIG. 3.

Figure 5:
FIG. 5 is a diagram illustrating exemplary model data referenced during object interpretation processing.

The object interpretation unit 28 carries out object interpretation processing to interpret a state of the object appearing in the image and then give a meaning to this state of the object by referencing model data as illustrated in FIG. 5 (described later) on the basis of the analysis results supplied from the object feature point analyzer 26. Subsequently, the object interpretation unit 28 supplies a flag name indicating the state of the object determined through the object interpretation processing to the interaction interpretation unit 29. Note that the object interpretation processing by the object interpretation unit 28 will be described later with reference to the model data illustrated in FIG. 5.

The face position information is supplied to the interaction interpretation unit 29 from the face detector 22, the object position information is supplied thereto from the object detector 23, the depth information on each of the pixels is supplied thereto from the distance measurement unit 24, the flag name indicating the state of the face is supplied thereto from the face interpretation unit 27, and the flag name indicating the state of the object is supplied thereto from the object interpretation unit 28. The interaction interpretation unit 29 uses these items of information to carry out interaction interpretation processing in which interaction model data as illustrated in FIG. 6 (described later) is referenced such that a relationship between the face and the object is interpreted (determined) and then, a meaning is given to this relationship. Subsequently, the interaction interpretation unit 29 supplies, to the map creation unit 30 and the display image creation unit 31, the flag name for interaction indicating the relationship between the face and the object determined through the interaction interpretation processing. Note that the interaction interpretation processing by the interaction interpretation unit 29 will be described later with reference to the interaction model data illustrated in FIG. 6.

The face position information is supplied to the map creation unit 30 from the face detector 22, the object position information is supplied thereto from the object detector 23, the depth information on each of the pixels is supplied thereto from the distance measurement unit 24, and the flag name for interaction is supplied thereto from the interaction interpretation unit 29. The map creation unit 30 uses these items of information to carry out map creation processing in which map data used by the display image creation unit 31 when creating a display image is created such that the virtual effect is properly presented and thereafter, the map creation unit 30 supplies the created map data to the display image creation unit 31. Note that the map creation processing by the map creation unit 30 will be described later with reference to FIG. 7.

The display image creation unit 31 generates the virtual objects for masking the face and the object and the virtual effect corresponding to the relationship between the face and the object in accordance with the flag name for interaction supplied from the interaction interpretation unit 29. Subsequently, the display image creation unit 31 creates an image by adding the generated virtual objects and virtual effect to the image input to the image processing device 11. For example, the display image creation unit 31 creates the display image in which the virtual objects individually associated with the face and the object are superimposed thereon such that the face and the object are covered therewith and additionally, the virtual effect is superimposed on top thereof. In addition, at this time, the display image creation unit 31 creates the display image in accordance with the map data supplied from the map creation unit 30 such that the virtual effect is properly presented. Note that display image creation processing by the display image creation unit 31 will be described later with reference to FIG. 7.

The image processing device 11 configured as described above is capable of creating the display image in which the virtual objects individually associated with the face and the object move in line with the respective actions thereof in the real world and at the same time, the virtual effect is presented in accordance with the mutual relationship between the face and the object.

Figure 2:
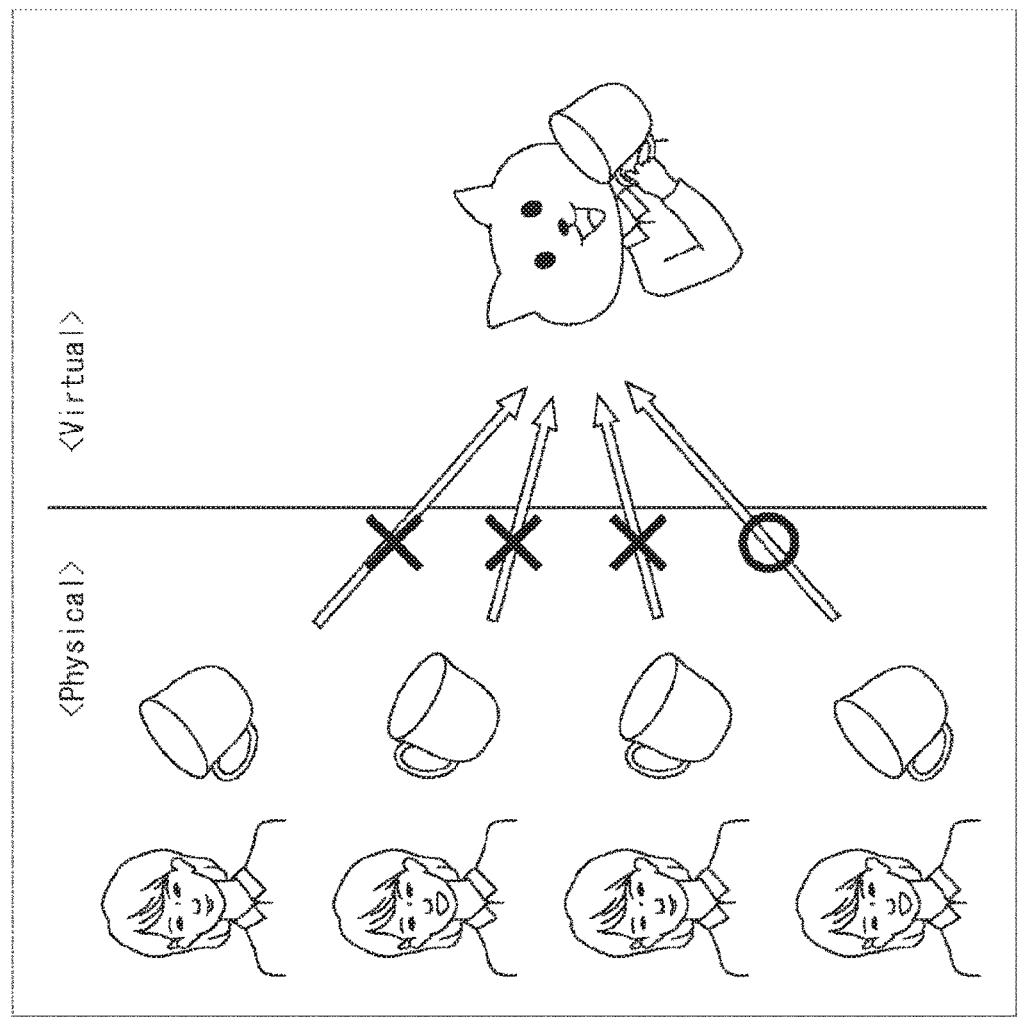
FIG. 2 is a diagram for explaining exemplary image processing by the image processing device.

An example of the image processing by the image processing device 11 is described here with reference to FIG. 2.

The left side of FIG. 2 illustrates an example of the faces and the objects detected from the images input to the image processing device 11, whereas the right side of FIG. 2 illustrates an exemplary virtual effect on the image created by the display image creation unit 31.

FIG. 2 illustrates an example where the virtual effect of drinking a drink in a cup is presented in accordance with a combination of an opening state of a mouth in a face and a tilt state of the cup. That is, the image processing device 11 presents the virtual effect of drinking a drink in the cup while the mouth in the face opens and the cup tilts to the face (in more detail, while the face and the cup have a positional relation of being in contact with each other).

Specifically, a first combination from the top on the left side of FIG. 2 represents a state where the mouth in the face closes and a state where the cup tilts to the face. With this combination, the virtual effect of drinking a drink in the cup is not presented. Likewise, a second combination from the top in FIG. 2 represents a state where the mouth in the face opens and a state where the cup tilts to an opposite side of the face. With this combination, the virtual effect of drinking a drink in the cup is not presented. In addition, a third combination from the top in FIG. 2 represents a state where the mouth in the face closes and a state where the cup tilts to the opposite side of the face. With this combination, the virtual effect of drinking a drink in the cup is not presented.

In contrast to the above combinations, a fourth combination from the top in FIG. 2 represents a state where the mouth in the face opens and a state where the cup tilts to the face. With this combination, the virtual effect of drinking a drink in the cup is presented.

For example, when the flag name indicating the state of the face "open mouth" is supplied and at the same time, the flag name indicating the state of the object "spilling out" is supplied, the interaction interpretation unit 29 outputs the flag name for interaction "person drinking object" on the basis of the position information on the face and the object as long as a direction in which the cup tilts is toward the face at a predetermined angle or more. Following this, the display image creation unit 31 generates a mask image in which a character is drinking a drink with his/her mouth open to composite with the image captured by the imaging unit 12. Furthermore, although the illustration is omitted, the virtual effect of a beverage overflowing from the cup or the virtual effect expressing a sound effect of "chug chug" may be presented.

Meanwhile, in the example in FIG. 2, the face of a subject person is covered with the mask image, while the cup appearing in the input image is displayed on the display image as it is. At this time, if the cup is covered with the mask image, it is difficult to properly recognize a situation of drinking a drink. For a solution to this, the image processing device 11 is able to generate the display image in accordance with the map data created by the map creation unit 30 such that the cup is displayed on top of the mask image. With this, the cup is avoided from being covered with the mask image and the display image that allows the proper recognition of the situation of drinking a drink can be generated.

Next, FIG. 3 illustrates an example of the model data referenced by the face interpretation unit 27 during the face interpretation processing.

As illustrated in FIG. 3, the model data defines positional relations and movements of the respective feature points with respect to characteristic expressions and actions in the face. Specifically, the flag name indicating the state of the face (e.g., open mouth, laughing, and sulky) is associated with the positions of the multiple feature points (e.g., X coordinates and Y coordinates on the face area) to be registered to the model data.

During the face interpretation processing, the face interpretation unit 27 performs the matching of the corresponding feature points between the position of the feature point of the face in the analysis result supplied from the face feature point analyzer 25 and the position of the feature point registered in the model data for each of the flag names. Subsequently, in a case where the degree of matching found out through the matching is equal to or higher than a predetermined threshold, the face interpretation unit 27 assumes that a meaning has been successfully given to the state of the face and then determines the flag name associated with the feature point having a highest degree of matching as the state of the face appearing in the image. Thereafter, the face interpretation unit 27 supplies this flag name indicating the state of the face to the interaction interpretation unit 29.

Next, FIG. 4 illustrates a beverage bottle as an example of the object detected by the object detector 23. Meanwhile, FIG. 5 illustrates the model data for the beverage bottle in FIG. 4 as an example of the model data referenced by the object interpretation unit 28 during the object interpretation processing.

For example, the object feature point analyzer 26 extracts the feature point locating an external form of the beverage bottle, the feature point locating a liquid surface of the beverage within the bottle, the feature point locating a logo mark on the bottle and so on, to supply to the object interpretation unit 28 as the analysis results.

During the object interpretation processing, the object interpretation unit 28 determines that the detected object is a beverage bottle on the basis of the positions of the feature points of the object in the analysis results supplied from the object feature point analyzer 26 and then references the model data corresponding thereto. Subsequently, the object interpretation unit 28 determines the logo mark depending on the feature point locating the logo mark on the bottle, or determines a tilt depending on the feature point locating the external form of the beverage bottle, or determines a remaining amount of the beverage, a movement of the liquid surface, or the like depending on the feature point locating the liquid surface of the beverage within the bottle.

As a result of this, the object interpretation unit 28 outputs the flag name indicating the state of the object "spilling out" in a case where a tilt of the beverage bottle is larger than 40°. Meanwhile, in a case where the liquid surface within the bottle is near the bottom of the bottle, the object interpretation unit 28 outputs the flag name indicating the state of the object "almost finishing". Alternatively, in a case where the liquid surface within the bottle repeatedly moves up and down, the object interpretation unit 28 outputs the flag name indicating the state of the object "being shaken".

As described above, the object interpretation unit 28 supplies the flag name indicating the state of the detected object to the interaction interpretation unit 29 in accordance with a result of the interpretation of the state of this object.

Next, FIG. 6 illustrates an example of the interaction model data referenced by the interaction interpretation unit 29 during the interaction interpretation processing.

As illustrated in FIG. 6, a meaning flag for the face (the flag name indicating the state of the face), a meaning flag for the object (the flag name indicating the state of the object), the positional relation between the face and the object, a depth relation between the face and the object, the flag name for interaction, and a display effect name are associated with one another to be registered to the interaction model data.

For example, the interaction interpretation unit 29 references such interaction model data to determine the corresponding flag name for interaction in accordance with the flag name indicating the state of the face, which is supplied from the face interpretation unit 27, the flag name indicating the state of the object, which is supplied from the object interpretation unit 28, the face position information supplied from the face detector 22, the object position information supplied from the object detector 23, and the depth information supplied from the distance measurement unit 24.

Specifically, the interaction interpretation unit 29 determines the flag name for interaction "person drinking object" in a case where the flag name indicating the state of the face is "open mouth", the flag name indicating the state of the object is "spilling out", the positional relation between the face and the object is "face and object in contact", and the depth relation between the face and the object is "object located in front of face".

Following this, the display image creation unit 31 reads, from the recording unit 13, the virtual objects for masking the face and the object corresponding to the display effect name "chug chug" corresponding to the flag name for interaction "person drinking object" as well as the virtual effect corresponding to the relationship between the face and the object and then creates the display image. Note that the virtual object and an effect component corresponding to a virtual effect name registered in the interaction model data is saved in the recording unit 13 to be kept therein.

Next, the map creation processing by the map creation unit 30 and the display image creation processing by the display image creation unit 31 will be described with reference to FIG. 7.

FIG. 7 illustrates an example where an image P1 in which a person holding a beverage bottle appears is input to the image processing device 11 and an image P2 is then displayed on the display unit 14 after the image processing is applied thereto such that the virtual effect such as a splashing beverage on the person from the bottle is presented.

The map creation unit 30 recognizes that the bottle is located in front of the person in accordance with the depth information supplied from the distance measurement unit 24 and then creates map data M in which an area of the detected bottle is expressed in such a manner that this area can be distinguished from the entire image P1.

The display image creation unit 31 composites the map data M created by the map creation unit 30 with a virtual object V1 read from the recording unit 13, thereby creating a virtual object V1' in which the area of the bottle is cut away. Additionally, the display image creation unit 31 composites the map data M created by the map creation unit 30 with a virtual effect V2 read from the recording unit 13, thereby creating a virtual object V2' in which the area of the bottle is cut away.

Subsequently, the display image creation unit 31 superimposes the virtual object V1' on the image P1 and further superimposes the virtual object V2' thereon, whereby the image P2 can be created. That is, the bottle is avoided from being covered with the virtual object and at the same time, the virtual effect is presented on top of the virtual object in the image P2.

Figure 8:
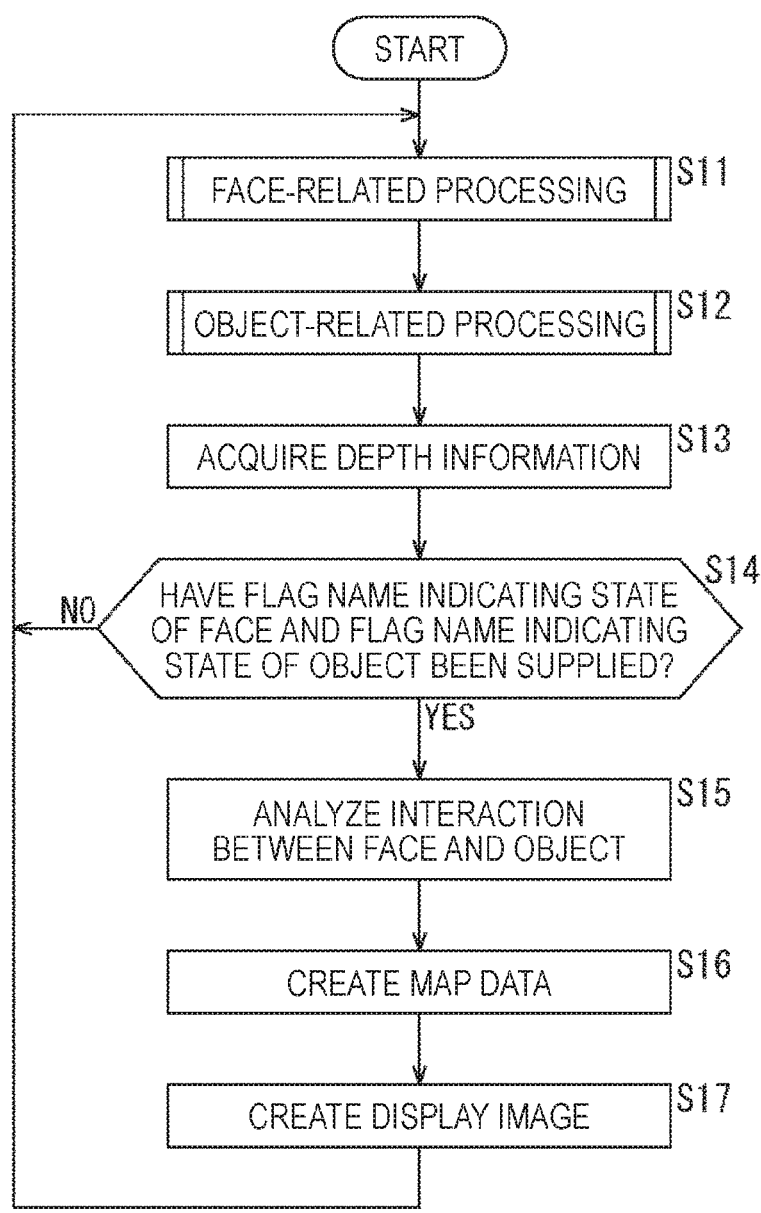
FIG. 8 is a flowchart for explaining the image processing.

Next, FIG. 8 is a flowchart for explaining the image processing carried out at the image processing device 11.

For example, the processing is started when the imaging unit 12 starts capturing a moving image to supply images constituting this moving image frame by frame. At step S11, face-related processing is carried out by the face detector 22, the face feature point analyzer 25, and the face interpretation unit 27. During the face-related processing, as will be described later with reference to a flowchart in FIG. 9, the flag name indicating the state of the face is supplied to the interaction interpretation unit 29 when the face is successfully detected and a meaning is successfully given to the state of the face.

At step S12, object-related processing is carried out by the object detector 23, the object feature point analyzer 26, and the object interpretation unit 28. During the object-related processing, as will be described later with reference to a flowchart in FIG. 10, the flag name indicating the state of the object is supplied to the interaction interpretation unit 29 when the object is successfully detected and a meaning is successfully given to the state of the object.

At step S13, the distance measurement unit 24 finds out the depth information on each of the pixels constituting the image to supply to the interaction interpretation unit 29 and the map creation unit 30.

At step S14, the interaction interpretation unit 29 judges whether the flag name indicating the state of the face and the flag name indicating the state of the object have been supplied.

For example, in a case where the face has not been successfully detected or a meaning has not been successfully given to the state of the face during the face-related processing at step S11, the flag name indicating the state of the face is not supplied to the interaction interpretation unit 29. Likewise, in a case where the object has not been successfully detected or a meaning has not been successfully given to the state of the object during the object-related processing at step S12, the flag name indicating the state of the object is not supplied to the interaction interpretation unit 29. Accordingly, in these cases, the interaction interpretation unit 29 judges, at step S14, that the flag name indicating the state of the face and the flag name indicating the state of the object have not been supplied. Following this, the processing returns to step S11 and similar processing is repeated thereafter by regarding the image of a subsequent frame as an image to be processed.

On the other hand, in a case where the flag name indicating the state of the face is supplied during the face-related processing at step S11 and the flag name indicating the state of the object is supplied during the object-related processing at step S12, the interaction interpretation unit 29 judges, at step S14, that the flag name indicating the state of the face and the flag name indicating the state of the object have been supplied and then, the processing proceeds to step S15.

The interaction interpretation unit 29 analyzes the interaction between the face and the object at step S15. That is, the interaction interpretation unit 29 references the interaction model data as illustrated in FIG. 6 to carry out the interaction interpretation processing and then supplies, to the map creation unit 30 and the display image creation unit 31, the flag name for interaction indicating the relationship between the face and the object.

At step S16, the map creation unit 30 carries out the map creation processing in which the map data used by the display image creation unit 31 when creating the display image is created such that the virtual effect is properly presented and then supplies the created map data to the display image creation unit 31.

At step S17, the display image creation unit 31 reads, from the recording unit 13, the virtual objects for masking the face and the object and the virtual effect corresponding to the relationship between the face and the object in accordance with the flag name for interaction supplied from the interaction interpretation unit 29. Subsequently, the display image creation unit 31 creates an image by editing the virtual objects and the virtual effect in accordance with the map data supplied from the map creation unit 30 and then adding the edited virtual objects and virtual effect to the image input to the image processing device 11. After the processing at step S17, the processing returns to step S11 and similar processing is repeated thereafter by regarding the image of a subsequent frame as an image to be processed.

Figure 9:
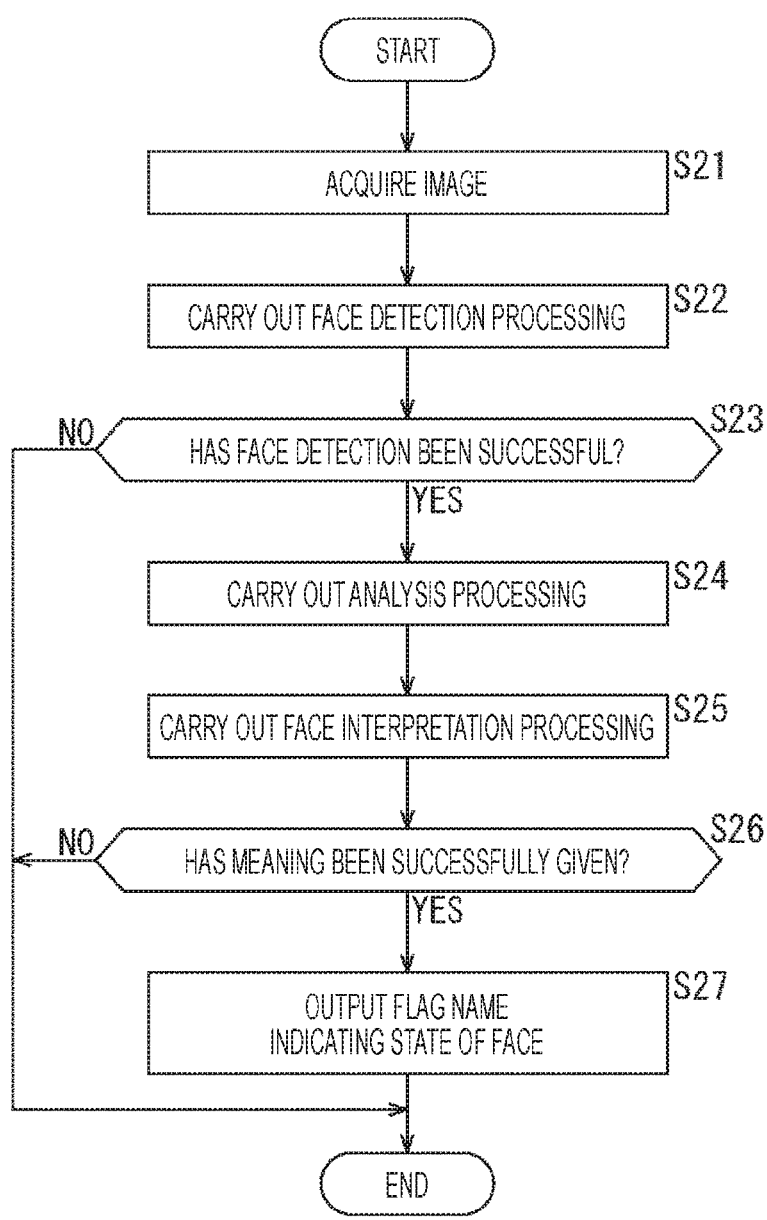
FIG. 9 is a flowchart for explaining face-related processing.

Next, FIG. 9 is a flowchart for explaining the face-related processing carried out at step S11 in FIG. 8.

The face detector 22 acquires the image supplied from the digital signal processing unit 21 at step S21 and then carries out the face detection processing at step S22 to detect a face from this image.

The face detector 22 judges, at step S23, whether the face detection has been successful during the face detection processing at step S22. To give an example, in a case where no face appears in the image, the face cannot be detected. Accordingly, the face detector 22 judges, at step S23, that the face detection has not been successful and the processing is thus terminated.

On the other hand, in a case where the face has been successfully detected from the image during the face detection processing at step S22, the face detector 22 judges, at step S23, that the face detection has been successful and then, the processing proceeds to step S24.

At step S24, the face detector 22 supplies, to the face feature point analyzer 25, the face area obtained by cutting out an area where the face detected at step S22 appears from the image such that the face feature point analyzer 25 carries out the analysis processing to extract the plurality of feature points included in this face area. Subsequently, the face feature point analyzer 25 supplies the positional information on the feature points extracted through the analysis processing to the face interpretation unit 27 as results of the analysis.

At step S25, the face interpretation unit 27 carries out the face interpretation processing to interpret the state of the face appearing in the image and then give a meaning to this state of the face on the basis of the analysis results supplied at step S24.

The face interpretation unit 27 judges, at step S26, whether a meaning has been successfully given to the state of the face during the face interpretation processing at step S25 and, in a case where it is judged that a meaning has not been successfully given, the processing is terminated.

On the other hand, in a case where the face interpretation unit 27 judges, at step S26, that a meaning has been successfully given to the state of the face during the face interpretation processing at step S25, the processing proceeds to step S27. At step S27, the face interpretation unit 27 supplies, to the interaction interpretation unit 29, the flag name indicating the state of the face to which a meaning has been given at step S25 and then, the processing is terminated.

Figure 10:
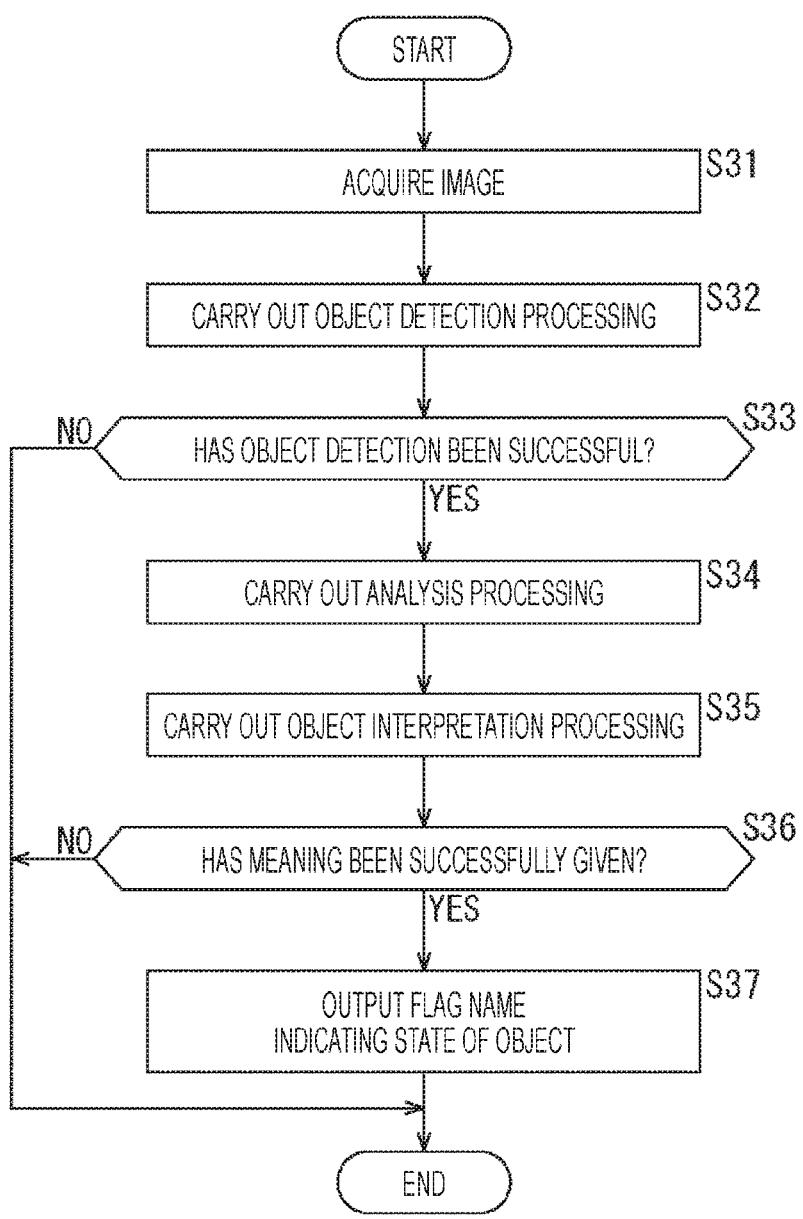
FIG. 10 is a flowchart for explaining object-related processing.

Next, FIG. 10 is a flowchart for explaining the object-related processing carried out at step S12 in FIG. 8.

The object detector 23 acquires the image supplied from the digital signal processing unit 21 at step S31 and then carries out the object detection processing at step S32 to detect an object from this image.

The object detector 23 judges, at step S33, whether the object detection has been successful during the object detection processing at step S32. To give an example, in a case where no object appears in the image, the object cannot be detected. Accordingly, the object detector 23 judges, at step S33, that the object detection has not been successful and the processing is thus terminated.

On the other hand, in a case where the object has been successfully detected from the image during the object detection processing at step S32, the object detector 23 judges, at step S33, that the object detection has been successful and then, the processing proceeds to step S34.

At step S34, the object detector 23 supplies, to the object feature point analyzer 26, the object area obtained by cutting out an area where the detected object appears from the image such that the object feature point analyzer 26 carries out the analysis processing to extract the plurality of feature points included in this object area. Subsequently, the object feature point analyzer 26 supplies the positional information on the feature points extracted through the analysis processing to the object interpretation unit 28 as results of the analysis.

At step S35, the object interpretation unit 28 carries out object interpretation processing to interpret the state of the object appearing in the image and then give a meaning to this state of the object on the basis of the analysis results supplied at step S34.

The object interpretation unit 28 judges, at step S36, whether a meaning has been successfully given to the state of the object during the object interpretation processing at step S35 and, in a case where it is judged that a meaning has not been successfully given, the processing is terminated.

On the other hand, in a case where the object interpretation unit 28 judges, at step S36, that a meaning has been successfully given to the state of the object during the object interpretation processing at step S35, the processing proceeds to step S37. At step S37, the object interpretation unit 28 supplies, to the interaction interpretation unit 29, the flag name indicating the state of the object to which a meaning has been given at step S35 and then, the processing is terminated.

As described above, the image processing device 11 is capable of creating the display image to which the virtual objects and the virtual effect are added on the basis of the flag name for interaction indicating the relationship between the face and the object in accordance with the flag name indicating the state of the face and the flag name indicating the state of the object.

Note that, although the above embodiment has described the interaction between the face and the object, the image processing device 11 is capable of presenting the virtual effect corresponding to the interaction between, for example, the plurality of faces.

The virtual effect corresponding to the interaction between faces of two subject persons will be described with reference to FIG. 11.

The left side of FIG. 11 illustrates images input to the image processing device 11, whereas the right side of FIG. 11 illustrates the display images to which the image processing has been applied at the image processing device 11.

As illustrated in an upper part of FIG. 11, when an image in which two subject persons appear side by side with their faces to the front is input, the display image is generated in which the virtual objects for faces are superimposed on the faces of the respective subject persons. In addition, as illustrated in a lower part of FIG. 11, when one subject person moves his/her face closer to the face of another subject person to pout his/her mouth out, the interaction interpretation unit 29 determines the relationship between these faces as "kissing on cheek" through the interaction interpretation processing. Following this, in the display image illustrated in the lower part of FIG. 11, the virtual object for the face of the one subject person is caused to pout his/her mouth out and additionally, the virtual effect of heart marks is presented on the eyes of the virtual object for the face of the another subject person. Furthermore, the virtual effect of the plurality of heart marks is presented between the two persons.

As described above, the image processing device 11 is also capable of presenting the virtual effect corresponding to the interaction between the plurality of faces.

Meanwhile, the image processing device 11 can deal with not only the interaction between the two items such as the face and the object or the face and the face but also the interaction between three or more items.

The virtual effect corresponding to the interaction between three subject persons and three objects will be described with reference to FIG. 12.

The left side of FIG. 12 illustrates images input to the image processing device 11, whereas the right side of FIG. 12 illustrates the display images to which the image processing has been applied at the image processing device 11.

As illustrated in an upper part of FIG. 12, when an image in which three subject persons each simply holding a mug of beer appear side by side with their faces to the front is input, the display image is generated in which the virtual objects for faces are superimposed on the faces of the respective subject persons and additionally, the virtual objects for objects such as the spilling froth of beer are superimposed on the mugs.

In addition, as illustrated in a lower part of FIG. 12, when the mugs held by the three subject persons make contact with one another, the interaction interpretation unit 29 determines the relationship therebetween as "making a toast all together" through the interaction interpretation processing. Following this, in the display image illustrated in the lower part of FIG. 12, the virtual objects for faces such as getting excited with the toast are presented and additionally, the virtual effect such as the froth of beer flying out due to the touching of the mugs at the toast is presented. Furthermore, the virtual effect such as an expression of a toast sound is presented.

As described above, the image processing device 11 is capable of presenting the virtual effect for a combination of, for example, the face and the face or the plurality of faces and the plurality of objects in a case where the plurality of subject persons and objects appear in the image.

Meanwhile, the image processing device 11 can be connected to a network such as the Internet via, for example, a communication unit (not illustrated), thereby being able to deliver the display image displayed on the display unit 14 via the network. At this time, the image processing device 11 is capable of varying the virtual effect such that a mutual influence is implemented with another user connected via the network.

For example, as illustrated in FIG. 13, when one user makes an "expression of happiness" after eating a particular doughnut, the image processing device 11 transmits information that the user makes the "expression of happiness" after eating this doughnut to a server device via the network. At the same time, the image processing device 11 presents an effect of "eating happily".

Subsequently, the server device can display a count value obtained by counting the number of times a user makes the "expression of happiness" (the number of times the effect of "eating happily" is used) after eating the particular doughnut (the same product) as the virtual effect such as a numerical value displayed next to the doughnut. In other words, the image processing device 11 is capable of transmitting and receiving the count value via the server device to and from another image processing device 11 connected via the network, thereby being able to vary the virtual effect (for example, increase a numerical value) in accordance with a sum total including the count value obtained at the another image processing device 11. Accordingly, the numerical value for the virtual effect is supposed to increase in line with an increase in users having made the "expressions of happiness". To give an example, the exemplary display in FIG. 13 illustrates the latest count value of "3562 it's good!".

As described above, the image processing device 11 is able to evaluate the particular doughnut regarding "whether it tastes good" and also continuously vary the virtual effect in real time so as to indicate which place a user who gives good evaluation this time is located in cumulative total. That is, the content of the effect of "eating happily" is not varied but what a large number of people have given good evaluation to this doughnut can be visually recognized in accordance with the number of times the effect of "eating happily" has been used.

The image processing device 11 is enabled to, as already described, continuously vary the result of giving a meaning to the interaction and the virtual effect corresponding thereto not only with a single user but also with, for example, all users together around the world. As a matter of course, the image processing device 11 may vary the virtual object or the virtual effect alone in accordance with various situations such as the number of times a predetermined relationship is determined, without being influenced by another user.

Meanwhile, in addition to varying the virtual effect owing to the mutual influence with another user as described above, the image processing device 11 is capable of varying the meaning given to the interaction in the time series.

For example, the image processing device 11 usually presents an effect "drinking beer" in a case where "drinking beer" is implemented one time during a certain time period. Thereafter, when "drinking beer" is implemented five times or more during a certain time period, the image processing device 11 can give a meaning of "drinking a large amount of beer", thereby being able to change the usual effect to an effect "drunk with beer" to present.

In addition, the image processing device 11 is capable of presenting a particular virtual effect only to a particular user in an image in which a plurality of users appears.

To give an example, other exemplary image processing by the image processing device 11 will be described with reference to FIG. 14.

Figure 14:
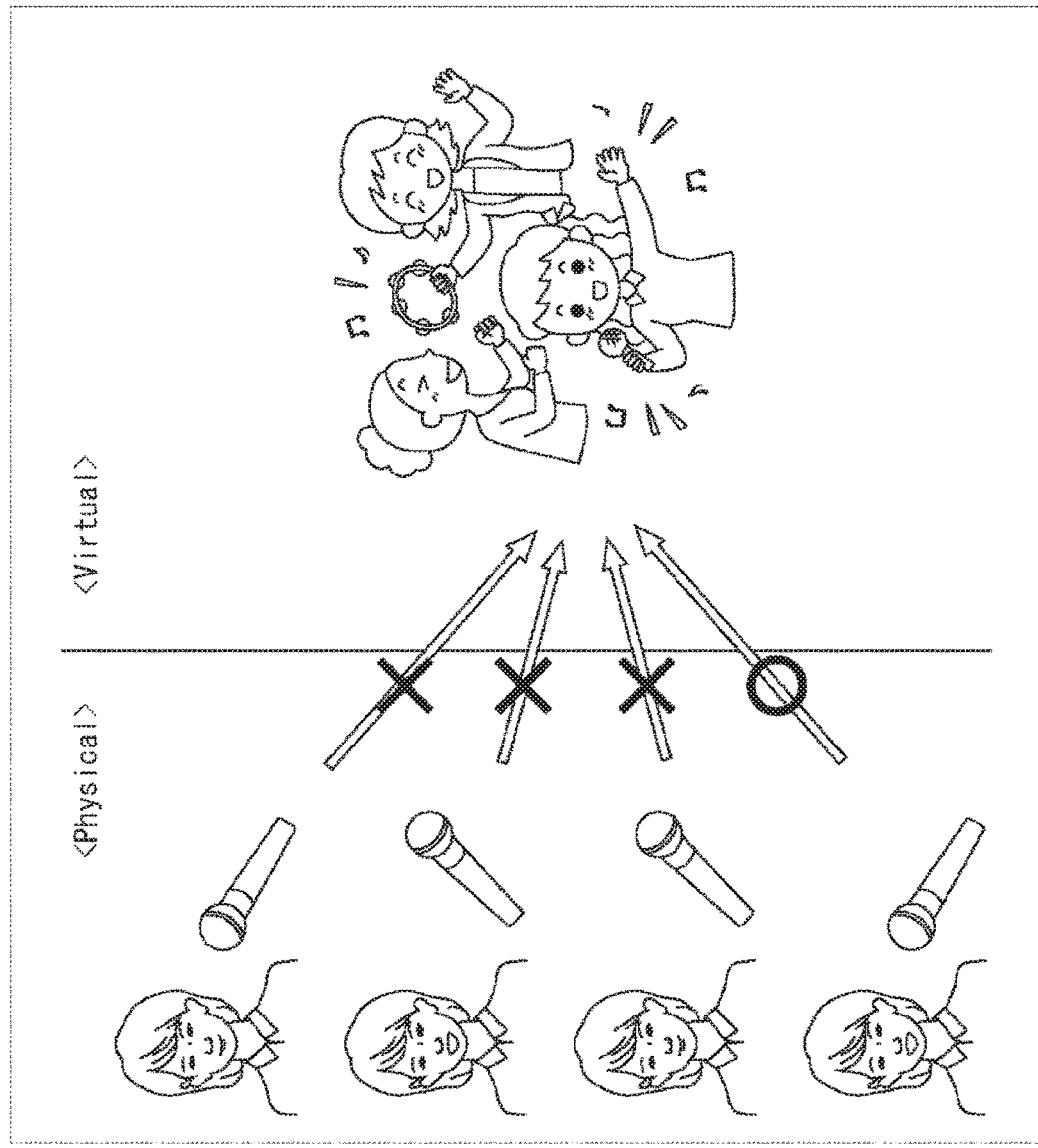
FIG. 14 is a diagram for explaining other exemplary image processing by the image processing device.

FIG. 14 illustrates an example where the image processing device 11 is carrying out the image processing on an image of a plurality of users enjoying karaoke. The left side of FIG. 14 illustrates an example of the faces and the objects detected from the images input to the image processing device 11, whereas the right side of FIG. 14 illustrates an exemplary virtual effect on the image created by the display image creation unit 31.

FIG. 14 illustrates an example where the virtual effect of singing in karaoke is presented in accordance with a combination of an opening state of a mouth in a face and the orientation of a microphone. That is, the image processing device 11 presents the virtual effect of singing a song to the microphone while the mouth in the face opens and the microphone points toward the face (in more detail, while the face and the microphone have a positional relation of being in contact with each other), as illustrated in a lowermost part of FIG. 14 on the left side.

For example, although it has been possible in the past to recognize an action of singing in karaoke depending on audio input to the microphone, it has been difficult to determine who is singing from among a plurality of users, which in turn has made it difficult to present the virtual effect such as the spotlight on a singing user. Besides, it has been also difficult to present the virtual effect on musical instruments in a case where users other than this singing user play the musical instruments.

In contrast to this, the image processing device 11 recognizes opening and closing of the user's mouth as well as the position and the orientation of the microphone along with the audio input to the microphone, thereby being able to determine the singing user and present the virtual effect such as the spotlight on this singing user. The image processing device 11 presents the virtual effect based on the interaction between the face and the microphone in this manner such that a more exciting atmosphere can be produced.

Furthermore, by registering a particular gesture in advance, the image processing device 11 also can generate a particular virtual effect when the singing user makes this gesture. Additionally, when a mechanism for locating the position of the microphone (e.g., a position transmitter or a luminous material) is built thereinto in order to recognize the positional information on the microphone in addition to the object detection processing by the object detector 23, the microphone can be recognized more accurately.

Note that the aforementioned interaction model data illustrated in FIG. 6 serves as an example and information used by the interaction interpretation unit 29 to carry out the interaction analysis processing is not limited to the information as illustrated in FIG. 6. For example, when carrying out the interaction analysis processing, the interaction interpretation unit 29 may use auxiliary information such as audio recognition information, gesture recognition information, date and time information, present position information, weather information, surrounding area event information, and information available via the network. To give an example, in a case where a particular region is visited to drink beer, the image processing device 11 can create the display image of which a background is composited with the virtual effect in which a character relating to this particular region is drunk.

Furthermore, in the image processing device 11, the model data referenced by the face interpretation unit 27 during the face interpretation processing is not limited to the use of data defined in advance such as the one illustrated in FIG. 3. For example, the user may personally specify a combination of the feature points corresponding to an expression, an action and so on to register to the model data such that the face interpretation unit 27 performs the matching with the combination of the feature points registered by the user to determine the state of the face. Likewise, data registered by the user can be also used for the model data referenced by the object interpretation unit 28 during the object interpretation processing and the interaction model data referenced by the interaction interpretation unit 29 during the interaction interpretation processing.

Meanwhile, the image processing device 11 can use an approach of detecting a logo mark on the object as a method used by the object detector 23 when detecting the object from the image, or alternatively, can use an approach of detecting a predetermined code attached to the object or an approach of detecting an outline or a color of the object. The object detector 23 may also use the depth information found out by the distance measurement unit 24 to detect a surface shape of the object such as unevenness.

In addition, the image processing device 11 can add, to the virtual object superimposed on the object, a link to an online page where this object can be purchased, a link to a product information page, or the like. With this, by operating (touching) the virtual object, a viewer who has viewed this image can easily purchase the object or obtain detailed information on this object.

In the image processing device 11, the display image creation unit 31 also can use an animation as the virtual effect in addition to the image. The display image creation unit 31 also can present the virtual effect on a section other than a target object such as the face or the object appearing in the image or directly transform the virtual object. That is, only the virtual effect may be presented on a section other than the face and the object without presenting the virtual objects for masking the face and the object.

As described thus far, according to the image processing device 11, the interaction between the face serving as a part of a human body and a physical object other than the face can be reflected in the interaction between the virtual objects associated therewith. Accordingly, the image processing device 11 can produce a larger number of the virtual effects using a larger number of behaviors in the real world as triggers in a situation where a person uses a thing in the real world.

When the physical object such as the face or the hand serving as a part of the human body and the physical object other than a part of the human body, such as a cup or glasses are taken into consideration, more unique communication can be provided by presenting a new virtual effect while these physical objects interact in the real world as well as realizing the interaction between the virtual objects individually associated therewith, as described above.

Note that the present technology is not limited to the application to the image processing device 11 but can be applied to an effect generation device configured to generate a variety of effects using a sound effect, audio, an odor, light emission and so on as an effect. Additionally, the effect generation device can combine some elements of these virtual effects to use. For example, the effect generation device can output a commercial song for a predetermined beverage in accordance with the interaction of drinking this beverage. Meanwhile, in addition to the above-described imaging device, the present technology can be applied to, for example, a portable device such as a smartphone or a wearable terminal and a personal computer including a web camera.

In addition, each of the processing procedures described with reference to the above flowcharts does not necessarily need to be handled in line with the order mentioned in the flowcharts along the time series. Processing carried out in parallel or separately (e.g., parallel processing or object processing) is also included. As for a program, a single CPU may be employed for the processing thereof, or alternatively, a plurality of CPUs may be employed for the distributed processing thereof.

Furthermore, a series of the above-described processing procedures (information processing method) can be carried out by hardware as well and also can be carried out by software. When the series of the processing procedures is carried out by software, a program constituting the software is installed from a program recording medium in which the program is recorded to a computer built into dedicated hardware or a computer capable of executing various types of functions when installed with various types of programs, for example, a general-purpose personal computer.

Figure 15:
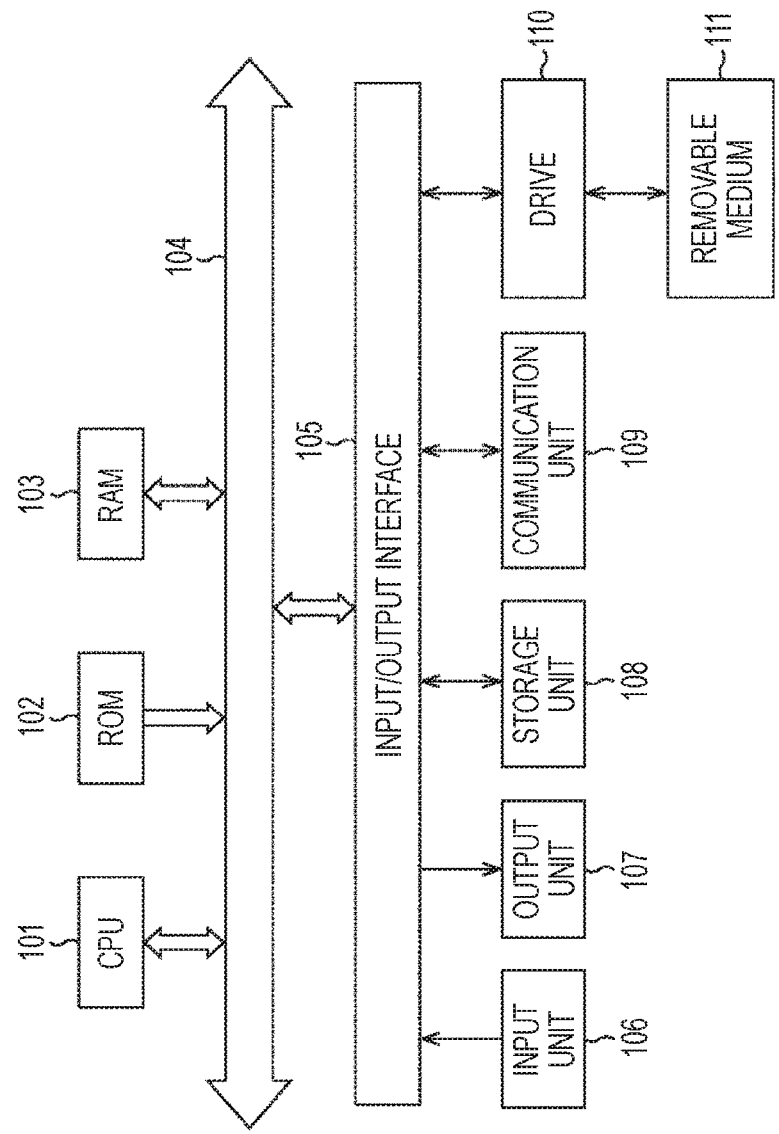
FIG. 15 is a block diagram illustrating an exemplary configuration of a computer according to an embodiment to which the present technology is applied.

FIG. 15 is a block diagram illustrating an exemplary hardware configuration of a computer that carries out the aforementioned series of the processing procedures using a program.

In the computer, a central processing unit (CPU) 101, a read only memory (ROM) 102, and a random access memory (RAM) 103 are interconnected through a bus 104.

Additionally, an input/output interface 105 is connected to the bus 104. An input unit 106, an output unit 107, a storage unit 108, a communication unit 109, and a drive 110 are connected to the input/output interface 105. The input unit 106 includes a keyboard, a mouse, and a microphone. The output unit 107 includes a display and a speaker. The storage unit 108 includes a hard disk and a non-volatile memory. The communication unit 109 includes a network interface. The drive 110 drives a removable medium 111 such as a magnetic disk, an optical disc, a magneto-optical disk, or a semiconductor memory.

In the computer configured as described above, for example, the aforementioned series of the processing procedures is carried out in such a manner that the CPU 101 loads a program stored in the storage unit 108 to the RAM 103 via the input/output interface 105 and the bus 104 to execute.

For example, the program executed by the computer (CPU 101) is provided by being recorded in the removable medium 111 serving as a package medium constituted by a magnetic disk (including a flexible disk), an optical disc (e.g., a compact disc-read only memory (CD-ROM) and a digital versatile disc (DVD)), a magneto-optical disk, a semiconductor memory or the like. Alternatively, the program is provided via a wired or wireless transmission medium such as a local area network, the Internet, or digital broadcasting.

In addition, the program can be installed to the storage unit 108 via the input/output interface 105 by mounting the removable medium 111 in the drive 110. The program also can be installed to the storage unit 108 via a wired or wireless transmission medium when received by the communication unit 109. As an alternative manner, the program can be installed to the ROM 102 or the storage unit 108 in advance.

Note that the present technology can be also configured as described below.

(1)

An effect generation device including:

a detector that detects two or more target objects at least including a face from an input image; and an effect generator that generates a predetermined corresponding effect depending on a relation between the target objects detected by the detector.

(2)

The effect generation device according to the aforementioned (1), further including a determination unit that determines a relationship between the plurality of target objects including positions of the target objects and a state of at least one of the target objects, in which the effect generator generates the effect on the basis of the relationship between the target objects determined by the determination unit.

(3)

The effect generation device according to the aforementioned (2), in which the determination unit determines a state of a part constituting the face detected by the detector and a state of an object detected by the detector as the states of the target objects, while determining a positional relation between the face and the object as the relationship between the target objects, and the effect generator generates the effect on the basis of the state of the part constituting the face, the state of the object, and a change in the positional relation between the face and the object, which have been determined by the determination unit.

(4) The effect generation device according to any one of the aforementioned (1) to (3), in which
the effect generator generates a mask image that masks the target object and a display effect that expresses the relationship between the target objects and creates an output image presenting the mask image and the display effect superimposed on the input image.

(5) The effect generation device according to any one of the aforementioned (2) to (4), further including a face feature point analyzer that extracts a plurality of feature points locating the part constituting the face serving as the target object detected from the input image, in which
the determination unit determines the state of the part constituting the face detected from the input image on the basis of the plurality of feature points detected by the face feature point analyzer.

(6) The effect generation device according to any one of the aforementioned (2) to (5), further including an object feature point analyzer that extracts a plurality of feature points locating a part constituting the object serving as the target object other than the face detected from the input image, in which
the determination unit determines the state of the object detected from the input image on the basis of the plurality of feature points detected by the object feature point analyzer.

(7) The effect generation device according to any one of the aforementioned (2) to (6), in which
the determination unit determines a mutual relationship between the face and the object on the basis of the state of the part constituting the face, the state of the object, and the positional relation in the input image between the face and the object.

(8) The effect generation device according to any one of the aforementioned (2) to (7), further including a distance measurement unit that measures distances to the face and the object appearing in the input image and finds out depths thereof in a direction perpendicularly intersecting the input image, in which
the determination unit uses a depth relation between the face and the object to determine the mutual relationship between the face and the object.

(9) The effect generation device according to the aforementioned (8), further including a map creation unit that creates map data used to prevent a mask image for face configured to mask the face from masking the object on the basis of the depth relation found out by the distance measurement unit with respect to the face detected from the input image and the object detected from the input image.

(10) The effect generation device according to any one of the aforementioned (4) to (9), in which
the effect generator varies the mask image or the display effect in accordance with situations.

(11) The effect generation device according to the aforementioned (10), in which
the effect generator varies the mask image or the display effect in accordance with the number of times a predetermined relationship between predetermined target objects is determined by the determination unit.

(12) The effect generation device according to the aforementioned (10) or (11), in which
the effect generator varies a predetermined display effect in accordance with a count value obtained by counting the number of times this display effect is used.

(13) The effect generation device according to the aforementioned (12), in which
the effect generator varies the predetermined display effect in accordance with a sum total of the count values transmitted to and received from another effect generation device connected via a network.

(14) The effect generation device according to any one of the aforementioned (2) to (13), in which
the determination unit determines the relationship between the target objects also on the basis of audio recognition information, gesture recognition information, date and time information, present position information, weather information, surrounding area event information, or information available via a network.

(15) An effect generation method including the steps of:
detecting two or more target objects at least including a face from an input image; and
generating a predetermined corresponding effect depending on a relation between the detected target objects.

(16) A program that causes a computer to carry out processing including the steps of:
detecting two or more target objects at least including a face from an input image; and
generating a predetermined corresponding effect depending on a relation between the detected target objects.

The embodiments are not limited to the aforementioned embodiments and various modifications can be made without departing from the scope of the present disclosure.

REFERENCE SIGNS LIST

11 Image processing device
12 Imaging unit
13 Recording unit
14 Display unit
21 Digital signal processing unit
22 Face detector
23 Object detector
24 Distance measurement unit
25 Face feature point analyzer
26 Object feature point analyzer
27 Face interpretation unit
28 Object interpretation unit
29 Interaction interpretation unit
30 Map creation unit
31 Display image creation unit

The invention claimed is:
1. An effect generation device, comprising:
circuitry configured to:
detect a plurality of target objects from an input image, wherein a first target object of the plurality of target objects includes a face;
determine a relation between positions of each of the plurality of target objects and a first state of the first target object based on information associated with the plurality of target objects, wherein
the information associated with the plurality of target objects includes at least one of date and time information, weather information, or surrounding area event information, and
the first state corresponds to an expression of the face; and
generate a first display effect on the input image based on the relation.

2. The effect generation device according to claim 1, wherein the circuitry is further configured to:
determine a second state of a part of the face and a third state of a second target object of the plurality of target objects, wherein the second target object is different from the first target object;
determine a positional relation between the face and the second target object; and
generate the first display effect based on each of the second state of the part of the face, the third state of the second target object, and the positional relation between the face and the second target object.

3. The effect generation device according to claim 2, wherein the circuitry is further configured to:
extract a plurality of first feature points from the input image, wherein the plurality of first feature points corresponds to the part of the face; and
determine the second state of the part of the face based on the plurality of first feature points.

4. The effect generation device according to claim 3, wherein the circuitry is further configured to:
extract a plurality of second feature points from the input image, wherein the plurality of second feature points corresponds to a part of the second target object; and
determine the third state of the second target object based on the plurality of second feature points.

5. The effect generation device according to claim 4, wherein the circuitry is further configured to determine a mutual relationship between the face and the second target object based on the second state of the part of the face, the third state of the second target object, and the positional relation between the face and the second target object.

6. The effect generation device according to claim 5, wherein the circuitry is further configured to:
measure a first distance between an external imaging device and the face;
measure a second distance between the external imaging device and the second target object,
wherein each of the first distance and the second distance is in a direction perpendicular to the input image; and
determine the mutual relationship between the face and the second target object based on the first distance and the second distance.

7. The effect generation device according to claim 6, wherein the circuitry is further configured to:
generate map data based on the first distance and the second distance;
control a mask operation, by a mask image, on the second target object based on the map data; and
mask the face with the mask image based on the control of the mask operation.

8. The effect generation device according to claim 1, wherein the circuitry is further configured to:
generate a mask image;
mask the first target object with the mask image;
generate a second display effect to express the relation between the plurality of target objects;
superimpose the second display effect on the input image; and
generate an output image based on the mask image and the second display effect superimposed on the input image.

9. The effect generation device according to claim 8, wherein the circuitry is further configured to vary one of the mask image or the second display effect based on a situation associated with the plurality of target objects.

10. The effect generation device according to claim 9, wherein the situation corresponds to a number of times the relation between the plurality of target objects is determined.

11. The effect generation device according to claim 9, wherein the circuitry is further configured to:
determine a count value of a number of times the second display effect is generated; and
vary the second display effect based on the count value.

12. The effect generation device according to claim 9, wherein the circuitry is further configured to:
transmit a first count value to an external effect generation device;
receive a second count value from the external effect generation device,
wherein each of the first count value and the second count value is associated with a number of times the second display effect is generated; and
vary the second display effect based on a sum total of the first count value and the second count value,
wherein the effect generation device is communicatively connected to the external effect generation device via a network.

13. The effect generation device according to claim 1, wherein the circuitry is further configured to determine the relation between the plurality of target objects based on at least one of audio recognition information, gesture recognition information, or information available via a network.

14. An effect generation method, comprising:
in an effect generation device that comprises circuitry:
detecting, by the circuitry, a plurality of target objects from an input image, wherein a first target object of the plurality of target objects includes a face;
determining, by the circuitry, a relation between positions of each of the plurality of target objects and a first state of the first target object based on information associated with the plurality of target objects, wherein
the information associated with the plurality of target objects includes at least one of date and time information, weather information, or surrounding area event information; and
the first state corresponds to an expression of the face; and
generating, by the circuitry, a display effect on the input image based on the relation.

15. A non-transitory computer readable medium having stored thereon, computer-executable instructions which when executed by a processor of an effect generation device, cause the processor to execute operations, the operations comprising:
detecting a plurality of target objects from an input image, wherein a first target object of the plurality of target objects includes a face;
determining a relation between positions of each of the plurality of target objects and a first state of the first target object based on information associated with the plurality of target objects, wherein
the information associated with the plurality of target objects includes at least one of date and time information, weather information, or surrounding area event information, and
the first state corresponds to an expression of the face; and
generating a display effect on the input image based on the relation.

* * * * *